United States Patent
Seto et al.

(10) Patent No.: US 6,841,494 B2
(45) Date of Patent: Jan. 11, 2005

(54) ULTRAVIOLET/INFRARED ABSORBENT GREEN GLASS WITH MEDIUM LIGHT TRANSMITTANCE

(75) Inventors: Hiromitsu Seto, Osaka (JP); Yukihito Nagashima, Osaka (JP); Shigekazu Yoshii, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/286,888

(22) Filed: Nov. 4, 2002

(65) Prior Publication Data

US 2003/0100432 A1 May 29, 2003

Related U.S. Application Data

(63) Continuation-in-part of application No. 09/664,730, filed on Sep. 19, 2000, now abandoned, which is a continuation-in-part of application No. 09/293,880, filed on Apr. 19, 1999, now abandoned.

(30) Foreign Application Priority Data

Jun. 17, 1998 (JP) ............................................. 11-169990

(51) Int. Cl.$^7$ .......................... C03C 3/087; C03C 3/095
(52) U.S. Cl. ............................... 501/70; 501/71; 501/64
(58) Field of Search ............................... 501/71, 70, 64

(56) References Cited

U.S. PATENT DOCUMENTS

| | | | | | |
|---|---|---|---|---|---|
| 5,837,629 | A | * | 11/1998 | Combes et al. | 501/70 |
| 6,274,523 | B1 | * | 8/2001 | Krumwiede et al. | 501/71 |
| 6,287,998 | B1 | * | 9/2001 | Seto et al. | 501/71 |
| 6,395,660 | B1 | * | 5/2002 | Seto et al. | 501/71 |
| 6,624,102 | B2 | * | 9/2003 | Seto et al. | 501/71 |

FOREIGN PATENT DOCUMENTS

| | | | |
|---|---|---|---|
| EP | 0653388 | * | 5/1995 |
| EP | 0825156 | * | 2/1998 |

* cited by examiner

*Primary Examiner*—Karl Group
(74) *Attorney, Agent, or Firm*—Manabu Kanesaka

(57) ABSTRACT

A glass has greenish color shade, a medium visible light transmittance, a low solar energy transmittance, and a low ultraviolet transmittance, and is suitable for a rear window of a vehicle arranged next to an ultraviolet/infrared absorbent glass with high light transmittance. The glass is formed of a base glass including 65 to 80 wt. % $SiO_2$, 0 to 5 wt. %, $Al_2O_3$; 2 to 10 wt. % MgO, 5 to 15 wt. % CaO wherein a total amount of MgO and CaO is 7 to 15 wt. % (excluding 7 wt. %), 10 to 18 wt. % $Na_2O$, 0 to 5 wt. % $K_2O$ wherein a total amount of $Na_2O$ and $K_2O$ is 10 to 20 wt. %, and 0 to 5 wt. % $B_2O_3$; and colorants including 1.0 to 1.35 wt. % total iron oxide as $Fe_2O_3$, 0.001 to 0.05 wt. % NiO, and 0 to 0.006 wt. % CoO (excluding 0.006 wt. %).

14 Claims, No Drawings

ULTRAVIOLET/INFRARED ABSORBENT GREEN GLASS WITH MEDIUM LIGHT TRANSMITTANCE

CROSS REFERENCE TO RELATED APPLICATION

This is a continuation-in-part application of Ser. No. 09/664,730 filed on Sep. 19, 2000, abandoned, which is a continuation-in-part application of Ser. No. 09/293,880 filed on Apr. 19, 1999, abandoned.

BACKGROUND OF THE INVENTION AND RELATED ART STATEMENT

The present invention relates to an ultraviolet/infrared absorbent green glass with a medium light transmittance. More particularly, the present invention relates to a glass having a greenish color shade and being suitable to be arranged next to a glass having a greenish color shade and a high visible light transmittance. The present invention also relates to a glass having a medium visible light transmittance, a low solar energy transmittance, and a low ultraviolet transmittance, so that it is useful for a privacy protecting glass of a vehicle.

Recently, a variety of glasses with ultraviolet/infrared absorptivity to be used as a vehicle windshield have been proposed from a viewpoint of preventing degradation of luxurious interior materials and reducing cooling load of the vehicle.

A front windshield of a vehicle needs to have a visible light transmittance higher than a specific level to secure enough visibility for a driver. An ultraviolet and heat rays absorbent glass mounted in the windshield has a greenish color shade because the glass also absorbs visible light having a wavelength near the ultraviolet range and the infrared range.

A glass for a rear window of a vehicle has no need such as that of the front windshield, and a glass with a relatively low visible light transmittance is preferably used for a rear windshield of a vehicle in a viewpoint of privacy protection. A glass having almost neutral color such as grayish color shade and a low visible light transmittance has been used.

A colored glass disclosed in WO 93/07095 consists of soda-lime-silica glass including colorants consisting of 0.45 to 2.5 weight percent of $Fe_2O_3$ (total iron), 0.001 to 0.02 weight percent of CoO, 0 to 0.0025 weight percent of Se, and 0 to 0.1 weight percent of $Cr_2O_3$. The solar energy transmittance (TG) of the glass is lower than the luminous transmittance measured by C.I.E. illuminant A (TLA). The glass with a thickness of 3.85 mm has a solar energy transmittance in a range of 10 to 48 percent and a luminous transmittance in a range of 20 to 60 percent.

A dull gray or green colored heat ray absorbent glass with a low light transmittance disclosed in WO 95/18075 consists of soda-lime-silica glass including colorants consisting of 0.90 to 1.90 weight percent of $Fe_2O_3$ (total iron), 0.002 to 0.25 weight percent of CoO, 0.0010 to 0.0060 weight percent of Se, and 0.1 to 0.2 weight percent of $TiO_2$. The glass with a thickness of 4 mm has a luminous transmittance in a range from 10.0 to 60.0% measured by using C.I.E illuminant A, an ultraviolet transmittance of less than 25.0%, an infrared transmittance of less than 50.0%, a dominant wavelength in a range from 480 to 575.5 nanometers by C.I.E. illuminant C, and an excitation purity of less than 6.0%.

A colored glass disclosed in WO 97/30948 consists of soda-lime-silica glass including colorants consisting of 1 to 3 weight percent of $Fe_2O_3$ (total iron), 0.1 to 1.0 weight percent of $TiO_2$, 0 to 500 ppm $Co_3O_4$, and FeO in a range from 10% to about 37%. The glass with a thickness of 4 mm has a visible light transmittance in a range from 10% to about 70% measured by C.I.E illuminant A.

A soda-lime-silica glass disclosed in WO 94/18135 has a neutral color by colorants including primary iron given by the following equation:

FeO (wt. %)≧0.007+(an optical concentration−0.036)/2.3

Also, the colorants include 0.25 to 1.75 weight percent of $Fe_2O_3$ and at least one selected from a group consisting of Se, $CO_3O_4$, $Nd_2O_3$, NiO, MnO, $V_2O_5$, $CeO_2$, $TiO_2$, CuO, and SnO. The glass with a thickness of 4 mm exhibits a luminous transmittance of more than 32%, an ultraviolet transmittance of less than 25%, a solar energy transmittance at least 7% less than the luminous transmittance, and a dominant wavelength preferably at less than 570 nanometer. Certain embodiments thereof may be used as a privacy protection glass.

The colored glass disclosed in WO 93/07095 includes $Fe_2O_3$, CoO and Se, and/or $Cr_2O_3$ is added thereto. Examples in PCT 6-503300 exhibit that Se is added to reduce the excitation purity, thereby being able to harmonize with a glass having a brighter green color shade. However, a large quantity of Se is not preferable in terms of the environmental consideration because Se has toxicity and is easy to vaporize. $Cr_2O_3$ sometimes forms chromite stones in the melting process and fluxes into a product to cause a defect. As chrome with an octahedral coordination has toxicity and is harmful to the environment, it is not preferable to be added to the glass as well.

A dull grayish green colored heat ray absorbent glass with a low light transmittance disclosed in WO 95/18075, which includes 0.1 to 2.0 weight percent of $TiO_2$ as an essential component, is not preferable because $TiO_2$ is expensive ingredient, thereby increasing the batch cost. Besides, the glass does not match well to a brighter green colored glass when arranged adjacently each other because of dull grayish green color shade.

Since the glass composition disclosed in WO 97/30948 also includes $TiO_2$ in a range from 0.1 to 1.0 weight percent as an essential component, the batch cost increases unfavorably.

The glasses having a medium visible light transmittance among the glasses disclosed in WO 94/18135 are provided with a halftone color shade due to colorants such as Fe, Ni, Se, Co, in the components. All of the samples include a large amount of Se, which is not favorable. Among them, the glass including Fe of more than 1.0 weight percent is not suitable for a windshield of a vehicle in a view of safety since the sample with a thickness of 4 mm has a visible light transmittance of less than 40% and has too dark shade. The glass has a dull grayish green color, thus it does not match to a brighter green colored glass when arranged next to each other.

Though the aforementioned glass with a low visible light transmittance is superior in terms of the privacy protection, an occupant in a vehicle cabin can not see the outside clearly through the glass. In a case that a high mounted breaking lamp is employed in a cabin of a vehicle, the glass having a low visible light transmittance is not suitable for a rear window because of its poor visibility. On the other hand, a glass with a medium light transmittance can be sufficient to some extent for both privacy protection and safety.

SUMMARY OF THE INVENTION

It is an object of the present invention to provide an ultraviolet/infrared absorbent glass having a medium light transmittance and a greenish color shade to be suitable for being arranged adjacently with an ultraviolet/infrared absorbent glass having a green color shade and a high visible light transmittance. The present invention provides the glass with a medium visible light transmittance, a low solar energy transmittance and a low ultraviolet transmittance so that it is useful for a privacy protecting glass of a vehicle as well.

The ultraviolet/infrared absorbent glass with a medium light transmittance of the present invention consists of a base glass and a colorant. The base glass includes:

65 to 80 wt. % $SiO_2$;
0 to 5 wt. % $Al_2O_3$;
2 to 10 wt. % MgO; (excluding 2 wt. %)
5 to 15 wt. % CaO wherein a total amount of MgO and CaO is between 7 and 15 wt. % (excluding 7 wt. %);
10 to 18 wt. % $Na_2O$;
0 to 5 wt. % $K_2O$ wherein a total amount of $Na_2O$ and $K_2O$ is between 10 and 20 wt. %; and
0 to 5 wt. % $B_2O_3$.
The colorant includes:
1.0 to 1.35 wt. % total iron oxide (T-$Fe_2O_3$) expressed as $Fe_2O_3$;
0.001 to 0.05 wt. % NiO; and
0 to 0.006 wt. % CoO (excluding 0.006 wt. %).

The glass with a thickness between 2 mm and 6 mm has a dominant wavelength measured by C.I.E. illuminant C in a range from 490 nm to 550 nm, an ultraviolet transmittance (Tuv) defined by ISO of not greater than 15%, and an excitation purity of less than 8%. Also, the glass with a thickness of 4 mm has a visible light transmittance (YA) of not less than 51%.

DETAILED DESCLIPTION OF PREFERRED EMBODIMENTS

Hereunder, embodiments of the invention will be made as regard to compositions of an ultraviolet/infrared absorbent glass with a medium light transmittance. It should be noted that components are represented in percentage by weight.

$SiO_2$(silica) is a principal component for forming the glass. A composition with less than 65% $SiO_2$ lowers the durability of the glass and a composition with more than 80% $SiO_2$ raises a melting temperature of the glass too high.

$Al_2O_3$ is a component for improving the durability of the glass. A composition with more than 5% $Al_2O_3$ raises a melting temperature of the glass too high. A preferable range of $Al_2O_3$ is between 0.1% and 2%.

MgO and CaO improve the durability of the glass and adjust a devitrification temperature and viscosity of the glass during molding. A composition with more than 10% MgO raises the devitrification temperature. A composition containing equal to or less than 2% MgO tends to form $S^{2-}$ ions so that the visible light transmittance of the glass is reduced due to a tint of amber. A composition with no greater than 2% MgO increases the devitrification temperature, which is unfavorable for preparing the glass. Less than 5% or more than 15% CaO raises the devitrification temperature of the glass. The durability of the glass is lowered when the total amount of MgO and CaO becomes less than 5%, while the devitrification temperature is increased when the total amount of MgO and CaO exceeds 15%.

$Na_2O$ and $K_2O$ promote the glass to melt. The efficiency of promotion of melting becomes poor when $Na_2O$ is contained less than 10% or the total of $Na_2O$ and $K_2O$ is less than 10%, while the durability of the glass is lowered when $Na_2O$ exceeds 18% or the total of $Na_2O$ and $K_2O$ exceeds 20%. It is preferable for $K_2O$ not to exceed 5% because of its expensive cost.

$B_2O_3$ is a component for improving the durability of the glass, prompting to melt, and yet enhancing the ultraviolet absorption. $B_2O_3$ should be less than 5%, since the transmittance in a visible light range is reduced, so that the color of the glass is easy to tint yellow. Also the molding becomes difficult due to the vaporization of $B_2O_3$ when $B_2O_3$ exceeds 5%.

Iron oxide is present in the form of $Fe_2O_3$ and the form of FeO in the glass. $Fe_2O_3$ is a component for improving the ultraviolet absorptivity and FeO is a component for improving the heat ray absorptivity.

When a total amount of the iron oxide (T-$Fe_2O_3$) expressed as $Fe_2O_3$ is less than 1.0%, the efficiency of ultraviolet and infrared absorptivity becomes too small to provide desired optical properties. On the other hand, when T-$Fe_2O_3$ exceeds 1.7%, it is possible that the temperature around a crown of a glass melting furnace exceeds its refractory temperature due to absorption of the heat ray by the ferrous oxide. In addition, in a case of successively producing glasses with a large amount of T-$Fe_2O_3$ using a glass melting furnace, it is required to take long time to alter a glass composition in the furnace. T-$Fe_2O_3$ is more preferable to be greater than 1.2% and less than 1.7%.

When the FeO/T-$Fe_2O_3$ ratio (a weight of FeO expressed as $Fe_2O_3$ against T-$Fe_2O_3$) is too low, sufficient heat ray absorptivity can not be obtained because of a small amount of FeO. When the FeO/T-$Fe_2O_3$ ratio is too high, a large amount of FeO reduces the visible light transmittance and makes the glass blue tint, since the effect of absorption by FeO extends the long-wave part of the visible portion. In addition, nickel sulfide stones are sometimes present in the molten glass because the molten glass is relatively reductive. Too high ratio of FeO/T-$Fe_2O_3$ is also unfavorable since it causes streaks with enough silica and silica scum. In the present invention, the FeO/T-$Fe_2O_3$ ratio is in a range between 10% and 40% to obtain a neutral color having high ultraviolet absorptivity and high heat ray absorptivity. In this case, values expressed as $Fe_2O_3$ are used for the content of FeO.

CoO is a component for forming a greenish color shade with cooperating with NiO and $Fe_2O_3$ for controlling the visible light transmittance. More than 0.01% CoO makes the color too blue tint and reduces the visible light transmittance. When using CoO, the content thereof is preferable in a range of 0.0005% to 0.01%.

NiO is a component for controlling the visible light transmittance and reducing the excitation purity like CoO. A composition with less then 0.001% NiO can not achieve sufficient efficiency. More than 0.05% NiO reduces the visible light transmittance and makes the glass too green tint. NiO is more preferable to be in a range between 0.001% and 0.02%.

It is known that the coordination number of NiO varies according to a rate of cooling glass, thereby changing the color of the glass. This is because the cooling changes the coordination number of oxide around $Ni^{2+}$ from 6 to 4 and thus changes an optical absorption. The absorption of $Ni^{2+}$ with octahedral coordination exists around 430 nanometers, thereby imparting yellow to the glass, while the absorption of $Ni^{2+}$ with tetrahedral coordination exists between 500 and 640 nanometers. Therefore, the excitation purity would be reduced to obtain the preferable shade by using $Ni^{2+}$ with tetrahedral coordination. A major application of the glass of the present invention is a windshield of a vehicle, which is normally reinforced by air blast cooling for safety. In the present invention, hence, the desired color shade can be obtained by discoloration due to the reinforcement process by air blast cooling.

$CeO_2$ is a component for improving the ultraviolet absorptivity and is present in the form of $Ce^{3+}$ or $Ce^{4+}$ in the glass. Particularly, $Ce^{3+}$ is effective in absorbing the ultraviolet light with less absorptivity in the visible light range. $TiO_2$ is a component for improving the ultraviolet absorptivity particularly by interacting with FeO. Any component of both can be added to improve the ultraviolet absorptivity within such a range as not to lose the desired greenish color shade, or to add a yellow tint in order to obtain the desired color shade. The use of expensive $CeO_2$ and $TiO_2$ increases the cost, so it is not preferable to use more than 1% $CeO_2$ and $TiO_2$.

One or more components among MnO, $V_2O_5$, $MoO_3$, CuO, $Cr_2O_3$, and the like may be added as a colorant. $SnO_2$ within a range from 0% to 1% in total may be added as a reducing agent or an agent for refining the glass in such a range as not to lose the desired color shade or properties. To further securely prevent the formation of nickel sulfide stones, ZnO may be added in a range from 0% to 1%.

In the present invention, the glass obtains the desired color shade without any injurious matter such as Se or Cr, so that the glass of the invention makes a load on the environment significantly lighter than does the prior art.

Hereinafter, embodiments of the present invention will be described with reference to examples.

EXAMPLES 1 THROUGH 5, COMPARATIVE EXAMPLES 1 THROUGH 5

A glass raw material is prepared by mixing a specific composition including ferric oxide, titanium oxide, cerium oxide, cobalt oxide, metallic selenium, nickel oxide, carbonaceous reducing agent (concretely, carbon powder, etc.). The glass raw material thus prepared is heated and melted in an electric furnace at 1500° C. for 4 hours. The molten glass is poured onto a stainless plate and annealed at the room temperature to obtain a 6 mm thick glass plate. After polishing the glass plate in such a manner that the thickness reduces to 4 mm, a sample is obtained.

Each sample is measured for the visible light transmittance by the C.I.E. illuminant A (YA), the solar energy transmittance (TG), the ultraviolet transmittance by ISO (Tuv), the dominant wavelength by the illuminant C (DW), and the excitation purity (Pe). And the chromaticity expressed as a* and b* is measured following C.I.E.L.A.B.

The samples of examples 4 and 5 are reheated, and then cooled in blasting air to be reinforced, so that the optical properties of the samples before and after reinforcement are measured.

Tables 1, 2 show base glass compositions of the obtained samples, T-$Fe_2O_3$ concentration, FeO/T-$Fe_2O_3$ rate, CoO concentration, NiO concentration, $CeO_2$ concentration, $TiO_2$ concentration, and Se concentration. The numerals in Tables are indicated as a weight percentage. Tables 1, 2 also show optical properties of the respective samples.

TABLE 1

|  | 1 | 2 | 3 | 4 | 5 |
|---|---|---|---|---|---|
| Base Glass Composition [wt. %] | | | | | |
| $SiO_2$ | 70.5 | 70.5 | 70.5 | 70.5 | 70.5 |
| $Al_2O_3$ | 1.8 | 1.8 | 1.8 | 1.8 | 1.8 |
| MgO | 3.8 | 3.8 | 3.8 | 3.8 | 3.8 |
| Cao | 7.8 | 7.8 | 7.8 | 7.8 | 7.8 |
| $Na_2O$ | 13.9 | 13.9 | 13.9 | 13.9 | 13.9 |
| $K_2O$ | 1.0 | 1.0 | 1.0 | 1.0 | 1.0 |
| $B_2O_3$ | 0.0 | 0.0 | 0.0 | 0.0 | 0.0 |
| Colorant [wt. %] | | | | | |
| NiO | 0.009 | 0.011 | 0.020 | 0.013 | 0.01 |
| CoO | 0 | 0.004 | 0.004 | 0.002 | 0.002 |
| $TiO_2$ | 0.03 | 0.5 | 0.03 | 0.03 | 0.003 |
| $CeO_2$ |  |  | 0.5 | 0.1 | 0 |
| T-$Fe_2O_3$ | 1.25 | 1.00 | 1.00 | 1.30 | 1.30 |
| FeO/T-$Fe_2O_3$ [%] | 27 | 28 | 29 | 27.8 | 25.9 |

TABLE 1-continued

| | | | | Optical Property | | | |
| --- | --- | --- | --- | --- | --- | --- | --- |
| | | | | | before/after reinforcement | | |
| | | | | before | after | before | after |
| YA (%) | 59.1 | 53.0 | 51.4 | 51.7 | 52.7 | 55.2 | 54.5 |
| TG (%) | 29.9 | 31.5 | 30.4 | 28.9 | 28.6 | 31.3 | 31.2 |
| Tuv (%) | 9.3 | 8.9 | 8.9 | 8.5 | 6.9 | 8.2 | 5.9 |
| DW (nm) | 532 | 502 | 502 | 503.0 | 505.4 | 511.7 | 514.3 |
| Pe (%) | 4.3 | 4.1 | 4.3 | 4.7 | 4.1 | 3.6 | 2.7 |
| a* | −11.5 | −10.0 | −10.5 | −11.9 | −11.2 | −11.5 | −11.0 |
| b* | 5.7 | 1.6 | 1.6 | 2.2 | 3.1 | 3.7 | 4.7 |

| | 6 | 7 | 8 | 9 | 10 | 11 | 12 |
| --- | --- | --- | --- | --- | --- | --- | --- |
| | Base Glass Composition [wt. %] | | | | | | |
| SiO₂ | 71.0 | 71.0 | 71.0 | 71.0 | 71.0 | 71.0 | 71.0 |
| Al₂O₃ | 1.6 | 1.6 | 1.6 | 1.6 | 1.6 | 1.6 | 1.6 |
| MgO | 3.6 | 3.6 | 3.6 | 3.6 | 3.6 | 3.6 | 3.6 |
| Cao | 7.7 | 7.7 | 7.7 | 7.7 | 7.7 | 7.7 | 7.7 |
| Na₂O | 13.8 | 13.8 | 13.8 | 13.8 | 13.8 | 13.8 | 13.8 |
| K₂O | 0.8 | 0.8 | 0.8 | 0.8 | 0.8 | 0.8 | 0.8 |
| B₂O₃ | | | | | | | |
| | Colorant [wt. %] | | | | | | |
| NiO | 0.016 | 0.012 | 0.018 | 0.016 | 0.01 | 0.016 | 0.013 |
| CoO | 0.004 | 0.0025 | 0.0039 | 0.0030 | 0.0050 | 0.0030 | 0.0027 |
| TiO₂ | 0.04 | 0.03 | 0.03 | 0.03 | 0.03 | 0.03 | 0.03 |
| CeO₂ | 0.1 | 0 | 0 | 0.2 | | | |
| T-Fe₂O₃ | 1.29 | 1.35 | 1.30 | 1.28 | 1.25 | 1.22 | 1.31 |
| FeO/T-Fe₂O₃ [%] | 24 | 29 | 24.4 | 24.8 | 23.4 | 25 | 24.3 |
| | Optical Property | | | | | | |
| | 4 mm | 4 mm | 4 mm | 4 mm | 4 mm | 4 mm | 4 mm |
| YA (%) | 51.9 | 52.0 | 51.6 | 51.1 | 51.8 | 51.4 | 51.4 |
| TG (%) | 27.0 | 25.7 | 27.9 | 27.6 | 30.9 | 28.7 | 28.1 |
| Tuv (%) | 7.0 | 8.3 | 8.6 | 8.2 | 9.6 | 9.5 | 8.1 |
| DW (nm) | 508 | 502 | 506 | 501 | 495 | 500 | 501 |
| Pe (%) | 4.0 | 5.5 | 4.1 | 4.8 | 6.5 | 4.8 | 4.8 |
| a* | −10.9 | −13.1 | −11.5 | −11.1 | −11.2 | −10.5 | −11.2 |
| b* | 2.8 | 2.1 | 2.8 | 1.6 | −0.6 | 1.2 | 1.6 |

TABLE 2

| | Comparative Example | | | | |
| --- | --- | --- | --- | --- | --- |
| | 1 | 2 | 3 | 4 | 5 |
| | Base Glass Composition [wt. %] | | | | |
| SiO₂ | 70.5 | 70.5 | 70.5 | 72.2 | 72.1 |
| Al₂O₃ | 1.8 | 1.8 | 1.8 | 0.1 | 0.7 |
| MgO | 3.8 | 3.8 | 3.8 | 3.8 | 3.8 |
| Cao | 7.8 | 7.8 | 7.8 | 8.8 | 8.9 |
| Na₂O | 13.9 | 13.9 | 13.9 | 13.3 | 14.2 |
| K₂O | 1.0 | 1.0 | 1.0 | 0.1 | 0.1 |
| B₂O₃ | | | | | |
| | Colorant [wt. %] | | | | |
| NiO | 0.030 | 0 | 0.027 | 0 | 0 |
| CoO | 0.012 | 0 | 0.009 | 0.002 | 0.006 |
| Se | 0 | 0 | 0 | 0.0009 | 0 |
| TiO₂ | 0.03 | 0.03 | 0.03 | 0 | 0 |
| CeO₂ | 0 | 0 | 0 | 0 | 0 |
| T-Fe₂O₃ | 1.3 | 1.3 | 0.85 | 1.0 | 1.5 |
| FeO/T-Fe₂O₃ [%] | 14.8 | 23.1 | 23.5 | 35 | 26.6 |
| | Optical Property | | | | |
| YA (%) | 38.9 | 65.3 | 46.1 | 52 | 45.8 |
| | (31.5) | (73.0) | | | |
| TG (%) | 31.6 | 35.0 | 34.7 | 28 | 26.8 |
| | (24.6) | (44.6) | | | |
| Tuv (%) | 6.8 | 6.9 | 15.7 | 15 | |
| | (3.9) | (12.9) | | | |
| DW (nm) | 496.0 | 516.4 | 491.7 | 496 | 490 |
| | (496.1) | (515.6) | | | |
| Pe (%) | 5.7 | 3.8 | 6.9 | 5.3 | 10.8 |
| | (6.9) | (2.7) | | | |
| a* | −9.4 | −13.1 | −8.5 | −9.5 | |
| | (−10.6) | (−9.6) | | | |
| b* | −0.2 | 4.8 | −2.2 | 0.3 | |
| | (−0.2) | (3.5) | | | |
| Note | *1 | *2 | | | *3 |

*1; a number in parenthesis is a reduced value based on a thickness of 5 mm.
*2; a number in parenthesis is a reduced value based on a thickness of 2.8 mm.
*3; a number in parenthesis is a reduced value based on a thickness of 3.8 mm.

Table 1 shows that all of the samples of examples 1–5 with a thickness of 4 mm have the dominant wavelength (DW) in a range of 502 to 532 nm (nanometers) measured by C.I.E. illuminant C, not greater than 15% of the ultraviolet transmittance (Tuv), and less than 8% of the excitation purity (Pe). These samples also have the FeO/T-Fe₂O₃ ratio in a range between 10% and 40%, and the chromaticity expressed as a* and b* in ranges of −15≦a*≦−5 and −5≦b*≦8.

Among these samples, the samples of examples 2 and 3 have more desirable color shade and properties than those of example 1 due to CoO.

The examples 1–3 reveal that a sufficient amount of T-Fe$_2$O$_3$ can easily impart high ultraviolet and infrared absorbability.

Example 3 including CeO$_2$ is shown to improve the ultraviolet absorption without losing the visible light transmittance and the solar energy transmittance. The other examples also include TiO$_2$, but only as an impurity in the raw materials.

According to the examples 4 and 5, the glass compositions and the optical properties before and after reinforcement process by air blasting are shown. These samples of the examples 4 and 5, all of which have the medium visible light transmittance and the low heat ray and ultraviolet transmittance, are shown to have lower ultraviolet transmittance reduced by about 1 to 2%. That is, the reinforcement process changes the coordination number of oxide around Ni$^{2+}$ from 6 to 4, and thus changes the optical absorption and the shade of the glass. The absorption of Ni$^{2+}$ with tetrahedral coordination exists between 500 and 640 nanometers. Therefore, the excitation purity would be reduced to obtain preferable shade due to the complementary green color of Ni$^{2+}$ with tetrahedral coordination.

The reinforced glass according to the examples 4 and 5 can be expected to have a good balance of a high visible light transmittance and green color shade when they are arranged next to each other, the effect of preventing degradation and discoloration of the interior materials and the privacy protecting effect when the glass is used for a rear window glass of a vehicle, a window of a building, or the like.

All of comparative examples 1–4 in Table 2 have compositions out of the range of the present invention. Comparative example 1 contains CoO as a colorant, in which an amount is out of the scope of the present invention. Comparative example 2 contains NiO, an amount of which is out of the scope of the present invention. Comparative example 3 contains T-Fe$_2$O$_3$, an amount of which is out of the present invention. Comparative example 4 has the same composition as that shown in WO 94/18135 as referred above. Comparative example 5 has the same composition as an example in WO 93/07095 as referred above.

These results explain that all the samples of comparative examples 1–3 can not achieve a good balance of the medium visible light transmittance, the low solar energy transmittance or the low ultraviolet transmittance just as the examples. The sample of comparative example 4 comprising a large amount of expensive and toxic selenium is not favorable in terms of the production and the environment. The sample of comparative example 5 has high excitation purity since the glass of the sample is too blue tint as compared to the examples and can not obtain the desired green color shade.

As detailed above, according to the present invention, an ultraviolet/infrared absorbent glass, which exhibits a medium visible light transmittance, a low solar energy, a low ultraviolet transmittance and green color shade, can be provided without any toxic substances such as selenium, chrome, etc., so that the glass of the present invention reduces the load on the environment significantly compared with the prior art.

The ultraviolet/infrared absorbent glass with a medium light transmittance can match well to the glass having a high visible light transmittance and brighter green shade when the glasses are arranged next to each other. Also, the glass of the invention prevents degradation and discoloration of the interior materials and protects privacy when the glass is used for a rear window of a vehicle, a window of a building, or the like.

What is claimed is:

1. An ultraviolet/infrared absorbent glass with a medium light transmittance comprising:
   a base glass including
      65 to 80 wt. % SiO$_2$,
      0 to 5 wt. % Al$_2$O$_3$,
      2 to 10 wt. % MgO (excluding 2 wt. %),
      5 to 15 wt. % CaO, wherein a total amount of MgO and CaO is between 7 and 15 wt. % (excluding 7 wt. %),
      10 to 18 wt. % Na$_2$O,
      0 to 5 wt. % K$_2$O, wherein a total amount of Na$_2$O and K$_2$O is between 10 and 20 wt. %, and
      0 to 5 wt. % B$_2$O$_3$;
   and colorants including
      1.0 to 1.35 wt. % total iron oxide (T-Fe$_2$O$_3$) expressed as Fe$_2$O$_3$,
      0.001 to 0.02 wt. % NiO, and
      0 to 0.006 wt. % CoO (excluding 0.006 wt. %),
   wherein said glass with a thickness between 2 mm and 6 mm has a dominant wavelength between 490 and 550 nanometers measured by C.I.E. illuminant C, no more than 15% of an ultraviolet transmittance (Tuv) specified by ISO, and less than 8% of an excitation purity, said glass with a thickness of 4 mm has a visible light transmittance (YA) of not less than 51% and not more than 59.1%, and no greater than 42% of a solar energy transmittance (TG), and said glass has less than 65% measured by C.I.E. illuminant A and less than 50% of a solar energy transmittance (TG) based on a thickness of 2.8 mm.

2. An ultraviolet/infrared absorbent glass according to claim 1, wherein FeO expressed as Fe$_2$O$_3$ is between 10 wt. % and 40 wt. % T-Fe$_2$O$_3$.

3. An ultraviolet/infrared absorbent glass according to claim 1, wherein said glass has a color expressed as −15≦a*≦−5 and −5≦b*≦8 defined by the C.I.E.L.A.B. coordinate.

4. An ultraviolet/infrared absorbent glass according to claim 1, wherein said CoO is included in a range between 0.0005 wt. % and 0.006 wt. % (excluding 0.006 wt. %).

5. An ultraviolet/infrared absorbent glass according to claim 1, wherein said NiO is included in a range between 0.002 wt. % and 0.02 wt. %.

6. An ultraviolet/infrared absorbent glass according to claim 1, wherein said T-Fe$_2$O$_3$ expressed as Fe$_2$O$_3$ is included more than 1.2 wt. % and no more than 1.35 wt. %.

7. An ultraviolet/infrared absorbent glass according to claim 1, wherein said colorants further comprise no greater than 1.0 wt. % of at least one material selected from the group consisting of CeO$_2$ and TiO$_2$.

8. An ultraviolet/infrared absorbent glass according to claim 1, wherein said MgO is equal to or greater than 3.8 wt. %.

9. An ultraviolet/infrared absorbent glass according to claim 1, wherein said glass has greenish color shade.

10. An ultraviolet/infrared absorbent glass according to claim 1, wherein said CoO is included in a range between 0.002 wt. % and 0.005 wt. %.

11. An ultraviolet/infrared absorbent glass according to claim 1, wherein said NiO is included in a range between 0.01 wt. % and 0.002 wt. %.

12. An ultraviolet/infrared absorbent glass according to claim 3, wherein said glass has a color expressed as $-15 \leq a^* \leq -11$ defined by the C.I.E.L.A.B. coordinate.

13. An ultraviolet/infrared absorbent glass according to claim 1, wherein said total iron oxide expressed as $Fe_2O_3$ is about 1.0 wt. %.

14. An ultraviolet/infrared absorbent glass according to claim 13, wherein said CoO is included in a range from 0 to 0.005 wt. % (excluding 0 wt %).

* * * * *